United States Patent [19]

Ishikawa et al.

[11] 3,996,342
[45] Dec. 7, 1976

[54] METHOD FOR THERMOCHEMICAL PRODUCTION OF HYDROGEN FROM WATER

[75] Inventors: Hiroshi Ishikawa, Ikeda; Masanori Nakane, Takatsuki; Eiichi Ishii; Yoshizo Miyake, both of Toyonaka, all of Japan

[73] Assignee: Agency of Industrial Science & Technology, Tokyo, Japan

[22] Filed: Sept. 2, 1975

[21] Appl. No.: 609,662

[30] Foreign Application Priority Data

Sept. 5, 1974 Japan ............................ 49-102767
Dec. 17, 1974 Japan ............................ 49-145475
Dec. 18, 1974 Japan ............................ 49-146169

[52] U.S. Cl. ............................... 423/657; 423/356; 423/438; 423/470; 423/497; 423/579; 423/507; 423/648

[51] Int. Cl.$^2$ ..................... C01B 1/02; C01B 1/04

[58] Field of Search .......... 423/657, 648, 470, 471, 423/356, 500, 507, 497

[56] References Cited

UNITED STATES PATENTS

| | | | |
|---|---|---|---|
| 2,003,378 | 6/1935 | MacMullin ........................ | 423/471 |
| 3,839,550 | 10/1974 | Wentorf, Jr. .................... | 423/648 X |
| 3,842,164 | 10/1974 | Wentorf, Jr. .................... | 423/657 X |
| 3,929,980 | 12/1975 | Abraham et al. ............... | 423/470 X |

FOREIGN PATENTS OR APPLICATIONS 148,782   1922   United Kingdom ............... 423/471

*Primary Examiner*—Edward Stern
*Attorney, Agent, or Firm*—Oblon, Fisher, Spivak, McClelland & Maier

[57] ABSTRACT

A method for the thermochemical production of hydrogen from water is disclosed in which barium iodide, carbon dioxide, ammonia and water are allowed to react with one another and give rise to barium carbonate and ammonium iodide, the ammonium iodide thus produced is thermally decomposed to produce hydrogen, iodine and ammonia, and the hydrogen thus produced is recovered as the product. The by-produced barium carbonate is allowed to react with the iodine remaining after the separation of hydrogen thereby to produce barium iodide, carbon dioxide and oxygen, and the barium iodide and carbon dioxide are recycled to the reaction system. The ammonia which remains after the separation of hydrogen is also recycled to the reaction system. By causing the by-products occurring in the various reactions to be recycled to the relevant reaction systems, hydrogen is efficiently produced from water at a reaction temperature of not more than 800° C.

4 Claims, No Drawings

METHOD FOR THERMOCHEMICAL PRODUCTION OF HYDROGEN FROM WATER

BACKGROUND OF THE INVENTION

The present invention relates to a method for the thermochemical production of hydrogen from water.

Establishment of a method for producing hydrogen by thermally decomposing water at temperatures below 1000° C, preferably below 800° C, and using as the heat source solar heat or heat from an atomic pile and as the medium such compounds as are available abundantly from the standpoint of natural resources is an important task to be fulfilled as soon as possible in view of the unavoidable exhaustion of fossil fuel and the consequent necessity for securing the source of secondary energy to take its place.

In the circumstances described above, there have heretofore been proposed 60-odd reaction cycles for the production of hydrogen by thermochemical decomposition of water.

Argonne National Laboratory, for example, has proposed a reaction cycle consisting of the following three steps:

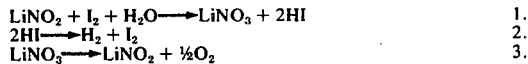

This reaction cycle has not yet been developed to the extent of commercial application, because the reaction of Formula (1) proceeds slowly and the reaction of Formula (3) may possibly produce $LiO_2$, a highly corrosive compound, under certain reaction conditions.

Euratom has proposed a reaction cycle which consists of the following three steps:

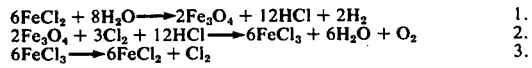

An experiment has shown that the reaction of Formula (2) in this reaction cycle does not result in any discernible generation of oxygen, indicating it difficult to have the reaction proceed through the cycle represented by these formulas. The reaction of Formula (3) is problematic in terms of process and heat balance because the heat of sublimation of $FeCl_3$ is great and, worse still, the ratio of decomposition is small.

As described above, the reaction cycles proposed to date invariably entail problems of some sort or other and, in their existing status, are difficult of commercial application.

An object of the present invention is to provide a method for producing hydrogen by allowing water to be thermally decomposed efficiently at temperatures of not more than 800° C through a combination of commercially quite feasible elementary reactions by using, as the medium, elements or compounds which are available abundantly in nature and which do not exhibit much toxicity and corrosiveness.

SUMMARY OF THE INVENTION

The present invention accomplishes the object described above by providing a method for the production of hydrogen by the thermochemical decomposition of water, which method comprises (a) a step of causing barium iodide, carbon dioxide, ammonia and water to react with one another to produce barium carbonate and ammonium iodide, (b) a step of allowing iodine to react upon the barium carbonate produced in (a) step thereby producing barium iodide, carbon dioxide and oxygen and (c) a step of thermally decomposing the ammonium iodide produced in (a) step thereby producing hydrogen, iodine and ammonia, with said reaction cycle continued while causing the barium iodide and carbon dioxide produced in (b) step to be recycled to (a) step, the ammonia produced in (c) step to be recycled to (a) step and the iodine produced in (c) step to be recycled to (b) step.

Further, the ammonium iodide obtained in (a) step is caused to react upon tri-iron tetraoxide to produce ferrous iodide, ammonia, water and iodine. The ferrous iodide thus produced is allowed to react with water to give rise to tri-iron tetraoxide, hydrogen and hydrogen iodide. The hydrogen iodide is decomposed into hydrogen and iodine. The by-produced tri-iron tetraoxide, ammonia, water and iodine which remains after recovery of hydrogen are recycled to the relevant reaction systems.

In addition, the ammonium iodide obtained in (a) step is allowed to react with magnesium oxide to produce magnesium iodide, ammonia and water, and the magnesium iodide thus produced is allowed to react with water to produce hydrogen iodide and magnesium oxide and the hydrogen iodide thus formed is decomposed into hydrogen and iodine. The by-produced magnesium oxide, ammonia, water and iodine which remain after recovery of hydrogen are recycled to the relevant reaction systems.

These elementary reactions proceed smoothly at temperatures below 800° C, the reaction products which occur therein are easily separated and recovered and the by-products which simultaneously occur therein can be recycled to relevant elementary reaction systems, enabling hydrogen to be produced easily from water on a commercial scale.

Other objects and other characteristic features of the present invention will become apparent from the following detailed description.

DETAILED DESCRIPTION OF THE INVENTION

The present invention has evolved from a detailed investigation for a novel reaction cycle for the thermochemical production of hydrogen. In the course of this investigation, the basic reactions involving the reactions of halogen containing compounds have been studied and it has been found consequently that, of the halogens, chlorine exhibits extremely high reactivity while the reactivity of bromine and that of iodine decrease with the increasing atomic numbers thereof. The investigation of the thermal decomposition behavior of hydro-halogen acids has led to the assertion that hydrogen iodide is easily decomposed into hydrogen and iodine while the thermal decomposition property of hydrogen bromide and that of hydrogen chloride are lower in the order mentioned.

The conclusion, therefore, is that favorable results cannot be expected from an attempt to obtain hydrogen from hydrogen chloride but that it is advantageous to use either hydrogen iodide or ammonium iodide because hydrogen is easily recovered therefrom by thermal decomposition or other means.

From the foregoing findings, it has become apparent that a reaction cycle including $2HI \longrightarrow H_2 + I_2$ as the basic reaction and a reaction cycle including $2NH_4I \longrightarrow 2NH_3 + 2HI \longrightarrow 2NH_3 + H_2 + I_2$ as the basic reaction are advantageous for the hydrochemical production of hydrogen. The study behind the present invention concentrated on the development of reaction cycles including these basic reactions and it consequently has been discovered that the reaction for generating hydrogen through the thermal decomposition of ammonium iodide can be carried out quite effectively by using barium iodide, ammonia and carbon dioxide in combination and that the barium iodide, carbon dioxide, ammonia and iodine which are by-products in the reactions can be recycled to the relevant elementary reaction systems.

It has also been found that when magnesium oxide or tri-iron tetraoxide is allowed to take part in these basic reaction cycles, hydrogen can be obtained through the thermal decomposition of hydrogen iodide. The present invention has been accomplished consequently.

The reaction cycles which underlie the method of the present invention are as illustrated in the following flow diagram.

reaction proves highly advantageous in terms of heat balance (in consideration of the fact that the concentration of aqueous solution by evaporation entails a heavy loss of latent heat of water through evaporation and can be a major cause for degraded heat efficiency).

In the second step, Reaction Formula (2), the barium carbonate obtained in the first step is allowed to react with iodine at 750°–800° C. The carbon dioxide gas generated in this reaction is absorbed in the ammonia water and consequently is separated from oxygen and, at the same time, there is obtained an aqueous ammonium carbonate solution to be supplied to the first step. In this case, since barium carbonate is in a solid state and the formed barium iodide is in a liquid state at the temperature at which the reaction proceeds, the barium carbonate and the barium iodide are readily separated and the reaction proceeds smoothly insofar as the reaction tube is held in an inclined position. It should be noted that although the corroding property on quartz of barium iodide increases with the increasing

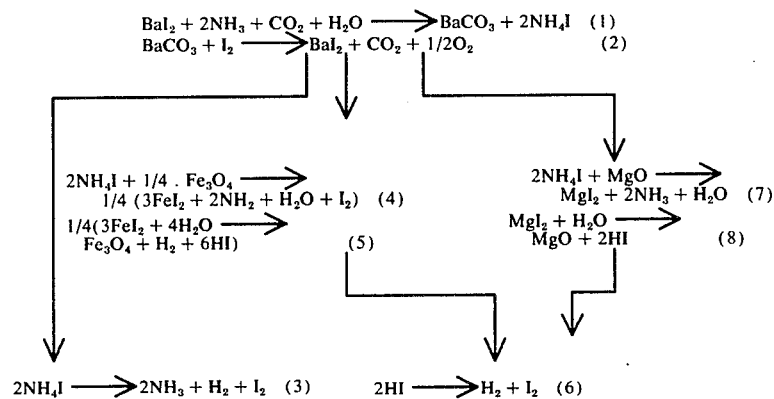

First, a description will be made of the basic reactions which underlie the method of this invention.

In the first step, Reaction Formula (1), barium iodide is dissolved in a saturated ammonium iodide solution (63.9 wt%) at 25° C and, while the resultant solution is kept at about 80° C under simultaneous agitation, ammonium carbonate is added thereto, with the result that there occurs precipitation of barium carbonate. The precipitated barium carbonate can easily be separated from the mother liquor by filtrating the reaction mixture while hot. When the filtrate remaining after the separation is cooled, the ammonium iodide present therein crystallizes out. Thus, ammonium iodide of a substantially equivalent weight to barium carbonate is obtained in the form of a precipitate.

In the reaction of Formula (1), separation and recovery of barium carbonate and ammonium iodide are effected easily because the reaction proceeds in the system in which ammonium iodide remains in a saturated state. To be more specific, ammonium iodide of an equivalent weight is obtained in the form of a precipitate by merely adding barium iodide to an ammonium iodide solution which is saturated when cold, allowing the reaction to proceed at an elevated temperature, separating the resultant barium carbonate by filtration and cooling the filtrate. Therefore, the reaction obviates the necessity of including an operation for concentration through vaporization of water despite the fact that this reaction is an aqueous solution reaction. From the standpoint of process, therefore, this temperature, practically no problem of corrosion arises insofar as the reaction temperature falls in the aforementioned range.

Recovery of hydrogen from the ammonium iodide formed in the first step is accomplished by subjecting said ammonium iodide to direct heating or by allowing it to react with tri-iron tetraoxide or magnesium oxide. First, the recovery of hydrogen by said direct heating of the ammonium iodide will be explained.

In the third step, Reaction Formula (3), the ammonium iodide obtained in the first step is heated to 500°–700° C so as to undergo thermal decomposition. When the gas produced by the decomposition is cooled, iodine is crystallized out. The iodine thus precipitated is separated and supplied to the second step. The gas remaining after the separation of iodine is introduced into water to have the ammonia component absorbed in the water and the hydrogen separated therefrom. The ammonia water thus produced and the carbon dioxide gas produced in the second step are allowed to react with each other and produce ammonium carbonate solution, which is supplied to the first step.

The separation of iodine from the gas which is generated in the third step may be accomplished by subjecting said gas in its original form to a treatment by a method which utilizes a special permselective membrane composed preponderantly of alumina or a method which utilizes the characteristic factor that iodine has a much greater mass than other components of the gas.

Next the recovery of hydrogen from the ammonium iodide through the reaction of said ammonium iodide with tri-iron tetraoxide will be described.

In the fourth step, Reaction Formula (4), the ammonium iodide obtained in the first step and tri-iron tetraoxide are intimately mixed and the resultant mixture is gradually heated to 500° C, with the result that there is produced ferrous iodide.

Commercially, a vertical reaction furnace is used, wherein tri-iron tetraoxide is introduced downwardly from the head thereof and hydrogen iodide is sublimated upwardly from the bottom thereof and the two compounds are consequently brought into continuous counterflow contact therein, with the result that the reaction of said two compounds will proceed efficiently. The ammonia and water which are produced in said reaction are used for the recovery of carbon dioxide gas in the second step.

In the fifth step, Reaction Formula (5), the ferrous iodide obtained in the fourth step is caused to react with steam at 500°–600° C. This reaction, similarly to the reaction of the fourth step, can be effected in the manner involving the counter-flow contact of the reactants. Where the resultant hydrogen iodide contains steam, said ferrous iodide can be utilized as the desiccant for said wet hydrogen iodide. The ferrous iodide which has consequently absorbed water can be used in its unaltered form in the present step of hydrolysis.

In the sixth step, Reaction Formula (6), the hydrogen iodide obtained in the fifth step is heated to 500°–800° C so as to be decomposed into iodine and hydrogen. The iodine and hydrogen are separated from each other by their difference in weight. Or the hydrogen is separated from the iodine by means of a special separating diaphragm utilizing the fact that the radius of the iodine atom is notably large. The iodine thus recovered is returned to the second step. Otherwise, this separation may be effected by a method utilizing the fact that hydrogen iodide is decomposed into hydrogen and iodine when it is exposed to a light of 2540 A at room temperature.

Now the method for recovering hydrogen from the ammonium iodide obtained in the first step by the reaction of said ammonium iodide with magnesium oxide will be explained.

In the seventh step, Reaction Formula (7), the ammonium iodide obtained in the first step and magnesium oxide are intimately mixed and the resultant mixture is gradually heated to 500° C, with the result that the reaction will give rise to magnesium iodide. The ammonia and water which are simultaneously generated in the reaction are used for the recovery of carbon dioxide gas in the second step.

In the eighth step, Reaction Formula (8), the magnesium iodide obtained in the seventh step is allowed to react with steam at 400°–500° C, with the result that the hydrolysis of the magnesium iodide will proceed quickly. When the formed hydrogen iodide contains steam, magnesium iodide can be used as the desiccant for the wet hydrogen iodide. The magnesium iodide which has consequently absorbed water can be used in its unaltered form in the present step of hydrolysis.

The hydrogen iodide gas evolved in the eighth step can be decomposed by heating at temperatures of 500°–800° C or by irradiation of light and separated into hydrogen and iodine as by using a separating diaphragm in much the same way as in the sixth step. The iodine consequently obtained is returned to the second step.

For the purpose of commercial production of hydrogen by the thermochemical decomposition of water, it is desirable to use a reaction cycle such that the elementary reactions thereof proceed smoothly and the overall amount of hydrogen formed thereby is large. What is more important is that there should be established a reaction cycle such that the consumption of energy is small, elements or compounds free from toxicity and corrosiveness are used as media, the reaction products are easy of separation and recovery, and the by-products can be recycled to the relevant elementary reaction systems.

When the method of the present invention is considered from the point of view mentioned above, it is noted that since the reaction in the second step proceeds at 750°–800° C, that in the third step proceeds at 500°–700° C, that in the fifth step proceeds at 500°–600° C, the thermal decomposition of hydrogen iodide proceeds at 500°–800° C and the reactions in the other steps proceed invariably below 500° C, the energy consumption for all the elementary reactions involved therein will suffice with the use of solar heat or heat from an atomic pile. Since iodine, ammonia, barium, magnesium, iron, etc. which are available abundantly as natural resources and do not exhibit any appreciable toxicity and corrosiveness are used as the media, there is absolutely no possibility that the reaction tanks will be corroded or the hydrogen recovered will contain noxious impurities. The reaction products which occur in the individual elementary reactions can easily be recovered and separated and the by-products which simultaneously occur in said reactions can be recycled to the relevant elementary reaction systems. Thus, the evolution of hydrogen can be effected continuously by the method of this invention by having the reaction systems replenished from time to time with water, which is about the only substance consumed in the reactions.

It should be noted particularly that the reactions in the individual steps are not always required to proceed to 100% and that they are not impeded by the presence of undecomposed or unreacted compounds such as, for example, of ammonium iodide, hydrogen iodide, tri-iron tetraoxide and magnesium oxide in the respective steps and that these undecomposed or unreacted compounds sooner or later participate in the relevant reactions in the course of circulating through the reaction systems, implying that the method of this invention practically produces one mole of hydrogen from one mole of water.

According to the present invention, the elementary reactions involved therein proceed without any harsh conditions, the by-products are recycled to the relevant elementary reaction systems, the heat energy consumption is small and hydrogen can be commercially produced with ease from water as described above.

The present invention will be described specifically herein below with reference to preferred embodiments. It should be understood that the present invention is not limited to these examples.

EXAMPLE 1

First step — In 1 kg of 63.9 wt% solution of ammonium iodide, 200g of barium iodide was dissolved. The resultant solution was heated to 80° C and, while under agitation, a saturated solution of ammonium carbonate was added thereto until barium carbonate was completely precipitated. The precipitated barium carbonate was separated by filtering the solution while still hot. Thus 100g of barium carbonate was obtained. When the filtrate was cooled to 25° C, there was obtained an almost equivalent weight (about 150g) of ammonium iodide.

Second step — An alumina reaction tube was packed with 100g of the barium carbonate obtained in the first step and then set in a position inclined so that the inlet side of the tube fell in a slightly lower level. Through the inlet side of said reaction tube, iodine gas was fed at a rate of about 12 g/min. to have the reaction proceed at about 750° C for 30 minutes.

The formed barium iodide melted itself and flowed out toward the inlet side of the reaction tube. Thus was formed 140g of barium iodide. Through the outlet side of the reaction tube, the generated gas was led into aqueous ammonia, so that the carbon dioxide component thereof was absorbed therein to give rise to an aqueous ammonium carbonate solution and at the same time the oxygen component thereof was separated.

Third step — A quartz tube was packed with 150g of the ammonium iodide obtained in the first step and set in position in a vertical electric furnace. The raw material unit thereof was heated to 500° C so that the solid ammonium iodide was gradually sublimated. The resultant vapor was led through a zone heated to about 700° C so as to undergo thermal decomposition. The gas resulting from the decomposition was sent through a condenser to separate iodine and then passed through water so that the ammonia gas was absorbed by water and consequently converted into aqueous ammonia and at the same time hydrogen gas was separated. Thus, 33g of iodine was obtained and 2.9 liters of hydrogen was recovered.

EXAMPLE 2

First step — By following the procedure of Example 1, barium carbonate and ammonium iodide were obtained by causing barium iodide to react with a saturated solution of ammonium carbonate.

Second step — Barium iodide and an aqueous ammonium carbonate solution were obtained by allowing the barium carbonate obtained in the first step to react with iodine in the same manner as in Example 1.

Fourth step — A thorough mixture of 30g of tri-iron tetraoxide and 150g of ammonium iodide was set in a quartz reaction tube and heated to 500° C at a rate of temperature increase of 20° C/min. and held at that temperature for 30 minutes. The gas generated consequently was cooled to room temperature to separate iodine in the form of crystals. Thus were obtained 90g of ferrous iodide and 25g of iodine.

Fifth step — The ferrous iodide, 90g, obtained in the fourth step was heated to 600° C and allowed to react with steam (fed at a rate of about 350 mg/min.) for 40 minutes. The gas consequently generated was dehydrated with ferrous iodide to produce a substantially dry mixed gas consisting of hydrogen and hydrogen iodide. Thus were obtained 14.4 liters of the mixed gas (made up of 2.0 liters of hydrogen and 12.4 liters of hydrogen iodide) and 21g of tri-iron tetraoxide.

Sixth step — The hydrogen iodide, 12.4 liters, obtained in the fifth step was thermally decomposed at about 650° C and separated into iodine and hydrogen by use of a permselective membrane composed preponderantly of alumina. Thus were obtained 1.6 liters of hydrogen and 18g of iodine.

EXAMPLE 3

First step — Barium carbonate and ammonium iodide were obtained by allowing barium iodide to react with a saturated solution of ammonium carbonate by following the procedure of Example 1.

Second step — The barium carbonate obtained in the first step was allowed to react with iodine in the same manner as in Example 1 to produce barium iodide and an aqueous ammonium carbonate solution.

Seventh step — A thorough mixture of 20g of magnesium oxide with 150g of the ammonium iodide obtained in the first step was set in a quartz reaction tube, heated to 500° C at a rate of temperature increase of 20° C/min. and held at that temperature for 30 minutes. The ammonia and water consequently formed were used in conjunction with the carbon dioxide gas formed in the second step to produce ammonium carbonate. Besides, 56g of magnesium iodide was simultaneously formed in the reaction tube.

Eighth step — The magnesium iodide, 56g, obtained in the seventh step was heated to 500° C and allowed to react with steam (fed at a rate of about 350 mg/min.) for 30 minutes. The gas consequently generated was dehydrated by using magnesium iodide, with the result that 9.0 liters of substantially dry hydrogen iodide and 8g of magnesium oxide were obtained.

Sixth step — The hydrogen iodide, 9.0 liters, obtained in the eighth step was thermally decomposed at about 650° C and then separated into iodine and hydrogen by means of a permselective membrane made of alumina. Thus were obtained 1.1 liters of hydrogen and 13g of iodine.

What is claimed is:

1. A method for the production of hydrogen by the thermochemical decomposition of water, which method comprises:
    a. preparing a mixture of barium carbonate and ammonium iodide by reacting barium iodide, carbon dioxide, ammonia and water;
    b. reacting the barium carbonate obtained in step (a) with iodine, thereby producing barium iodide, carbon dioxide and oxygen;
    c. thermally decomposing the ammonium iodide obtained in step (a), thereby producing hydrogen, iodine and ammonia;
    d. recycling the barium iodide and carbon dioxide obtained in step (b) to step (a);
    e. recycling the ammonia obtained in step (c) to step (a); and
    f. recycling the iodine obtained in step (c) to step (b).

2. The method according to claim 1, wherein step (a) is conducted in a saturated solution of ammonium iodide.

3. The method according to claim 1, wherein the reaction of step (b) is conducted at 750° to 800° C.

4. The method according to claim 1, wherein the reaction of step (c) is conducted at 500° C to 700° C.

* * * * *